United States Patent

[11] 3,592,425

| [72] | Inventors | Robert W. Randolph<br>St. Charles;<br>James C. Hammonds, St. Charles; Richard H. Dugge, St. Louis, all of, Mo. |
|---|---|---|
| [21] | Appl. No. | 855,654 |
| [22] | Filed | Sept. 5, 1969 |
| [45] | Patented | July 13, 1971 |
| [73] | Assignee | ACF Industries, Incorporated<br>New York, N.Y. |

[54] AIR HOSE SUPPORT FOR RAILWAY CARS
2 Claims, 4 Drawing Figs.

[52] U.S. Cl. ................................................. 248/53, 213/1
[51] Int. Cl. ........................................ F16l 3/16, B61h 13/38
[50] Field of Search .......................................... 248/53, 52, 51; 213/76, 1; 285/63; 280/421; 24/16 BP

[56] References Cited
UNITED STATES PATENTS

| 2,321,434 | 6/1943 | Stenzel | 248/53 |
| 3,147,523 | 9/1964 | Logan | 248/74 X |
| 3,220,041 | 11/1965 | Jepson | 24/16 X |
| 3,344,935 | 10/1967 | Stewart | 213/76 X |
| 3,422,499 | 1/1969 | Merser | 24/16 |

Primary Examiner—Chancellor E. Harris
Attorney—Eugene N. Riddle

ABSTRACT: A resilient air hose support for railway cars extending beneath the coupler between the coupler head and the air hose therebeneath. The support is formed of a rubberlike material and has a lower end portion connected to the air hose. The lower end portion of the support has a relatively wide intermediate section extending about the hose, an eye adjacent one end of the intermediate section, and a protuberance adjacent the other end of the intermediate section fitting within the eye and releasably holding the support in position about the circumference of the air hose.

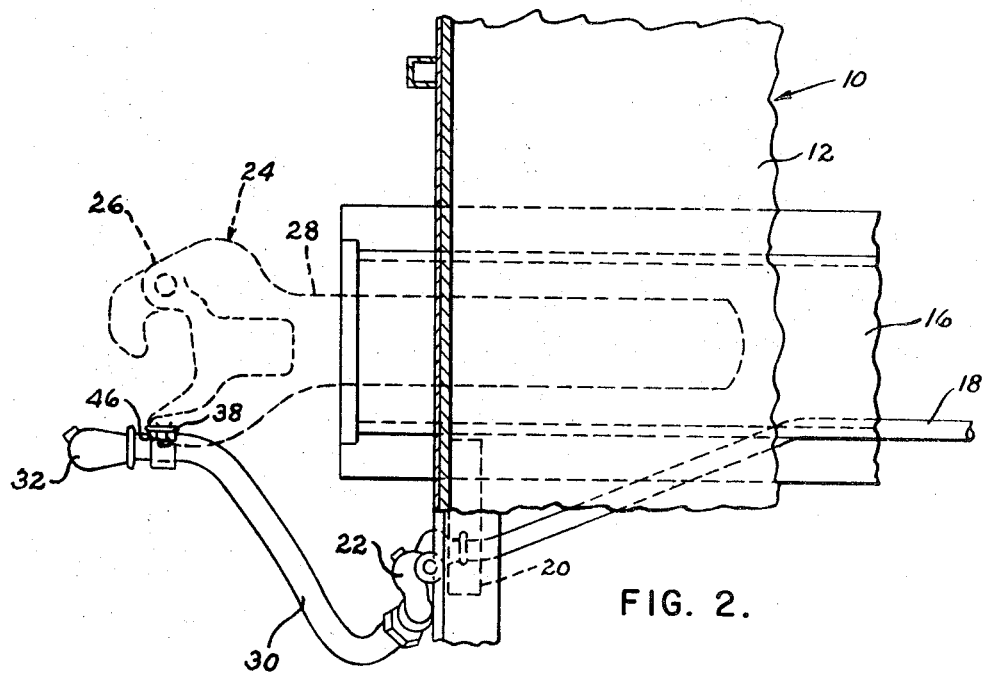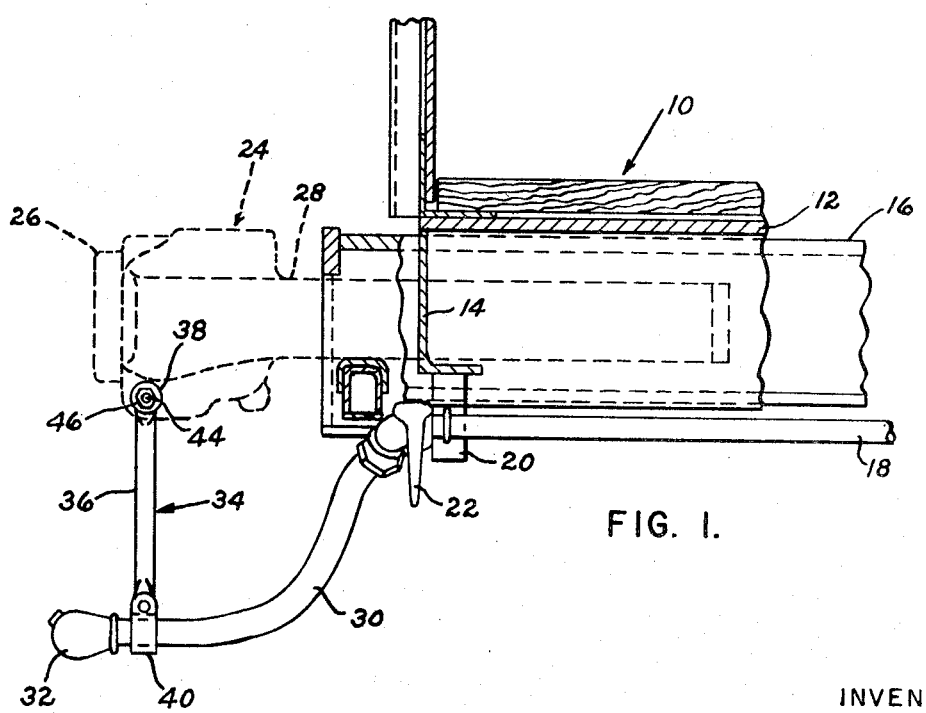

AIR HOSE SUPPORT FOR RAILWAY CARS

BACKGROUND OF THE INVENTION

Normally, a chain supports the end of the air hose and is secured at its upper end to the coupler head. With long travel cushion units, the bypassing of couplers, and long length car with wide coupler swings, damage to conventional chain-type supports is common and replacement or repair of the air hose support is required quite frequently.

DESCRIPTION OF THE INVENTION

The present invention provides a support for the air hose which is resilient and will permit the air hose and coupler to be drawn apart from each other a substantial distance without any damage occurring to the support. The support is formed of a one-piece rubberlike material having a central portion of a generally circular cross section. The upper end portion of the support has an eye which fits about a stud on the coupler head to secure the upper end of the support. The lower end portion of the support comprises, a relatively wide intermediate section extending about the hose, an eye adjacent one end of the intermediate section, and a protuberance adjacent the other end of the intermediate section fitting within the eye and releasably holding the intermediate section in position about the circumference of the air hose. The protuberance is easily inserted within the eye to secure the support and may also be easily withdrawn from the eye to be detached from the air hose. Thus, this support may be employed as a retrofit on existing railway cars.

The invention accordingly comprises the constructions hereinafter described, the scope of the invention being indicated in the following claims.

In the accompanying drawings, in which one of various possible embodiments of the invention is illustrated, FIG. 1 is a side elevation illustrating an end portion of a railway car with an air hose supported beneath a coupler by the present invention;

FIG. 2 is a top plan of the end portion of the railway car illustrated in FIG. 1;

Figure 3:
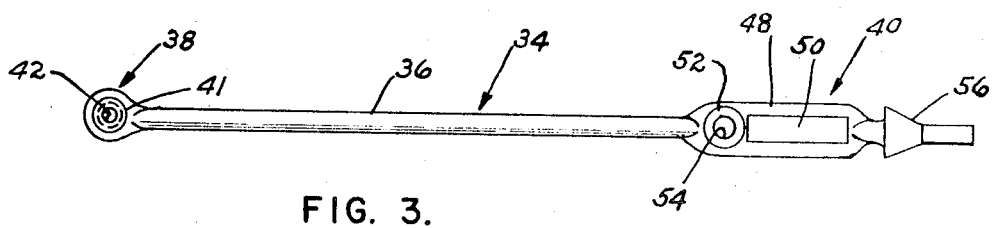
FIG. 3 is an enlarged plan of the resilient support shown as removed from the railway car.
Figure 4:
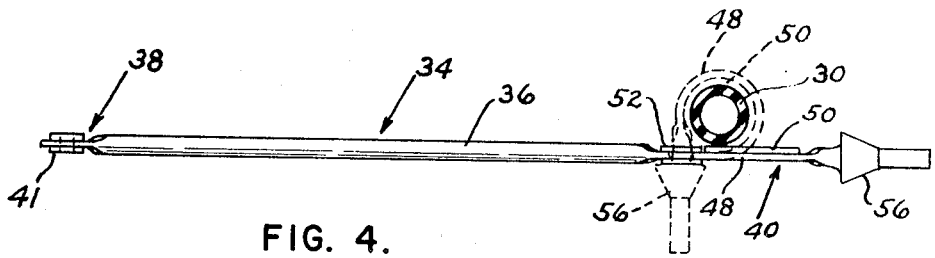
FIG. 4 is an enlarged side elevation of the resilient support of FIG. 3 illustrating the connection of the lower end portion to the air hose.

Referring to the drawings for a better understanding of the invention, a railway car is indicated at 10 and has an underframe 12. An end sill 14 forms part of underframe 12 and a center sill structure 16 extends the length of underframe 12. A trainline is indicated at 18 and a bracket 20 on the underside of end sill 14 supports trainline 18. A conventional angle cock 22 adjacent end sill 14 is provided for operation of the trainline. Mounted within center sill structure 16 is a coupler generally indicated 24 having a coupler head 26 and a coupler shank 28. A flexible air hose 30 extends from angle cock 22 and has an end coupling or gladhand 32 thereon.

Supporting air hose 30 and forming this invention is a resilient support generally indicated 34. Support 34 is formed of a rubber or rubberlike composition and is easily stretchable while returning to its original position under its bias. Support 34 is of a one-piece construction having, a central portion 36 formed of a circular cross section, an integral upper end portion 38, and an integral lower end portion 40. Upper end portion 38 has a metal grommet 41 forming an opening or eye 42 which receive a stud 44 on coupler head 24. A nut 46 on the extending threaded end of stud 44 secures the upper end of support 34. Lower end portion 40 of support 34 comprises an intermediate section 48 which is generally flat for extending about the circumference of air hose 30 and has a raised wear strip 50 thereon. An inner end section of end portion 40 has a metal grommet 52 forming an opening or eye 54 therein and the outer other end section of end portion 40 has a generally frustoconically shaped protuberance 56 thereon which is adapted to be drawn through eye 54 of grommet 52.

Support 34 may be easily attached to a railway car by first extending intermediate section 48 about the circumference of air hose 30 adjacent coupling 32, and then drawing protuberance 56 through the eye 54 of grommet 52 by gripping the end of support 34. The conical-shaped end of protuberance 56 is of a diameter greater than the diameter of eye 54 and thereby holds support 34 in position about air hose 30. Support 34 may be secured to coupler head 24 by placing eye 42 on stud 44 and securing support 34 thereto by nut 46.

In the event it is necessary to replace support 34, the support may be easily removed by withdrawing protuberance 56 from eye 54 and removing nut 46. Manual gripping of the end of support 34 and stretching of protuberance 56 reduces its diameter for withdrawal from eye 54.

What we claim is:

1. In a railway car having a coupler with a coupler head thereof mounted for a generally lateral swinging movement relative to the longitudinal center line of the car and a trainline having a flexible air hose and end coupling generally beneath the coupler; the improvement comprising, an integral one-piece rubberlike resilient support for the flexible air hose having a central portion of a circular cross section and upper and lower end portions extending from the central portion, the upper end portion having an eye thereon for receiving a stud on the coupler head for securing the upper end portion, said lower end portion having a relatively wide flat intermediate section extending about the hose, an eye adjacent one end of said intermediate section, and a protuberance adjacent the other end of the intermediate section for fitting within the eye, said protuberance being generally frustoconical in shape and restraining movement from the eye after being drawn therethrough thereby to releasably hold the intermediate section in position about the circumference of the air hose.

2. In a railway car as set forth in claim 1, a wear strip on said flat intermediate section in contact with the air hose.